United States Patent [19]
Berdan, II

[11] Patent Number: 6,042,911
[45] Date of Patent: Mar. 28, 2000

[54] RESHAPABLE INSULATION ASSEMBLY

[75] Inventor: Clarke Berdan, II, Granville, Ohio

[73] Assignee: Owens Corning Fiberglas Technology, Inc., Summit, Ill.

[21] Appl. No.: 08/976,669

[22] Filed: Nov. 21, 1997

[51] Int. Cl.[7] .................................................. B29D 22/00
[52] U.S. Cl. ....................... 428/36.3; 428/36.1; 428/36.2; 428/43; 428/71; 428/74; 428/76; 428/131; 428/212; 428/220; 428/316.6; 156/71; 52/404.1
[58] Field of Search ................................ 428/74, 76, 220, 428/43, 71, 131, 228, 212, 36.1, 36.2, 316.6, 255, 36.3; 156/71; 52/98, 99, 404.1, 408

[56] References Cited

U.S. PATENT DOCUMENTS

| | | | |
|---|---|---|---|
| 5,277,955 | 1/1994 | Schelhorn et al. | 428/74 |
| 5,508,079 | 4/1996 | Grant et al. | 428/74 |
| 5,817,387 | 10/1998 | Allwein et al. | 428/43 |

*Primary Examiner*—Deborah Jones
*Assistant Examiner*—Abraham Bahta
*Attorney, Agent, or Firm*—Inger H. Eckert; Stephen W. Barns

[57] ABSTRACT

A reshapable insulation assembly and a method of using such insulation assembly are provided. An insulation assembly of the invention of a type useful in the insulation of buildings includes a conformable mineral fiber batt extending in a first direction, wherein the batt has a perimeter in a cross-section that is substantially perpendicular to the first direction, and an exterior layer extending in the first direction and overlying the perimeter of the batt, wherein the exterior layer has a perimeter in the cross-section that is substantially greater than the perimeter of the batt. The exterior layer thereby loosely encapsulates the batt, whereby compression of the insulation assembly urges the assembly into a new shape with different dimensions in the cross-section.

11 Claims, 4 Drawing Sheets

RESHAPABLE INSULATION ASSEMBLY

TECHNICAL FIELD AND INDUSTRIAL APPLICABILITY OF THE INVENTION

This invention relates to an insulation assembly useful in the insulation of buildings and more particularly to a reshapable insulation assembly including a conformable mineral fiber insulating batt and to methods for making and using such insulation assembly.

BACKGROUND OF THE INVENTION

It is well known to insulate buildings using various types of insulating materials including mineral fibers such as fibrous glass wools. Processes for forming the fibers generally include forcing a molten glass composition through orifices in an outer wall of a centrifuge or spinner to produce relatively short, straight glass fibers. Typically a binder is added to the fibers prior to their collection in substantially planar layers. The binder after curing secures the fibers together to create a unitary piece of the insulating material.

The insulating material after curing is typically mechanically shaped and cut into a blanket or batt having a predetermined cross-sectional shape such as a rectangle. An exterior layer or facing is often secured to the batt to facilitate the ease of installing and handling of the insulation assemblies. After cutting these insulation assemblies are particularly suited for immediate installation between wall studs and ceiling and floor joists which are spaced apart a distance corresponding to the width of the assemblies. The term "joists" as used within this application will be understood to include studs, joists and other framing elements and structures between which insulation assemblies are positionable.

Insulation assemblies using short fibered batts that are bindered and thus relatively rigid have several disadvantages. First they cannot conform to variations in the spaces in which they are installed. The spaces between joists that receive these insulation assemblies often contain abnormal voids and other non-uniformities created by electrical wiring, plumbing lines, ducts and the like disposed in between the joists. In using the short fibered insulation assemblies the user either has to be content with gaps or voids in the insulation coverage or, alternatively, cut the insulation to fit.

In fact the prior art discloses methods for reducing at least some of the time and effort of the installer. U.S. Pat. No. 4,866,905 discloses for example a mineral fiber strip with laterally extending marking lines. An installer cuts along the lines to select a desired width of the product for installation. Similarly, U.S. Pat. No. 968,681 to Stokes and U.S. Pat. No. 1,238,356 to Paddack show cotton wadding strips of a substantial length and width. Longitudinal partial cuts extend along the length of the cotton wadding. These cuts facilitate cutting smaller width strips from the wadding by the user.

Providing partial cuts or marking lines can thus facilitate the cutting of insulation assemblies into desired sizes. They do not however eliminate the need to cut these insulation assemblies into desired shapes and sizes to fit them into non-traditionally sized areas, voids, and around abnormalities.

An additional problem with the short fibered, bindered insulation assemblies arises from the fact that they are designed and manufactured for installation in a particular spaced aperture. Since most framing has a standard or traditional size of either 16 inches or 24 inches between joists, manufacturers typically make products with both these widths. Most manufacturers, to meet the needs of users, make products with these widths in various heights and/or densities to enable the users to have desired R-value insulation installed. (R-value is a standard measure of the efficiency of insulation, or its thermal resistivity.)

However, many users have needs for installation of insulation assemblies of different sizes or different R-values. This plethora of product needs requires retailers of the insulation assemblies to commit a large amount of space to them in order to carry an entire product line. Understandably many sellers opt not to carry all of the sizes. This is particularly true of those sizes for which there is less or slower demand.

Thus users may not be able to locate an appropriately sized product because the manufacturer does not make it or the retailers the user locates do not stock it. In these instances the user must attempt to cut the insulation assembly to the appropriate size, seek an alternative type of insulation product, accept decreased efficiency by leaving gaps and spaces, or use additional insulation to overlay the joists, if possible.

One alternative form of insulation is loose fill products. These products have no performed shape and consist of individual groups of insulation fibers that are inserted into the space to be insulated. Installation of this form of insulation typically comprises blowing the fibers into a desired space. Thus the insulation does not have to be cut or otherwise sized for installation. However, the loose fill is difficult to handle, requires special equipment to install and may leave gaps or voids if not properly installed. Further, loose fill does not always achieve consistent coverage of the spaces in which it is installed (the density of the insulation material varies as installed and it may in some instances shift or compact over time). Loose fill also commonly has airborne particles that may irritate the skin and breathing passages of users.

An alternative wool insulation product recently developed overcomes some of the disadvantages of the short fibered products. U.S. Pat. No. 5,508,079 to Grant and Berdan describes this assembly and the method for making it. Specifically, Grant et al. disclose a process for the manufacture of a binderless, fibrous glass wool insulation. The process includes forming substantially long glass fibers that make up about 20 percent or more of the weight or number of all fibers. The fibers of these insulation assemblies upon formation are oriented in a spiral fashion and then mechanically shaped to produce a batt of a predetermined size and density. Securing an exterior layer, preferably formed of polyethylene that closely conforms to the perimeter of the batt, completes the insulation assembly.

The insulation assembly disclosed by Grant et al. provides a substantial advantage over the short fibered, bindered insulation assemblies of the prior art. These insulation assemblies, being less rigid, enable the user to conform the insulation assembly to occupy the voids frequently found between joists. The user merely conforms the batt to fill small voids and to adjust around the presence of items between the joists. It also enables the user to have greater portions of the assembly extend over the joist to directly abut adjacent insulation assemblies with reduced void spacing over the joists compared to short fibered, bindered insulation assemblies.

The conformable feature of this type of insulation assembly eliminates many instances of cutting the assembly as } compared with the short fibered, bindered insulation assemblies. Thus the conformable insulation assembly disclosed by Grant et al. provides a more convenient product for users. Nevertheless the conformable insulation assembly disclosed by Grant et al., like the short fibered, bindered products of the prior art, has some limitations. The conformable insulation assemblies as made and sold by Owens Corning under the trademark MIRAFLEX™ are adapted for installation in particular sized areas having a predetermined nominal width. The products as manufactured also have a standard thickness and/or density to provide a predetermined level of insulation given by the R-value. Thus, the manufacturer of these products must generally provide a plurality of products of different widths, e.g., 16 inch and 24 inch wide products. Additionally for each of these products the manufacturer must provide products having different heights and/or densities to provide different R-values of insulation assemblies for the user.

This necessarily means that the manufacturer of this type of insulation product must make a plethora of products to met the needs of most users. Nevertheless the needs of many users who need insulation to fit non-traditional joist spaces (e.g., 19.2 inches) or need non-standard insulation efficiency are still left with no choice but to cut these products, seek an alternative form of insulation, install overlying insulation assemblies or accept less efficient results. Additionally the retailers and distributors of these products may choose not to stock or carry products for which there is not high demand given the space and volume constraints of their businesses. Thus in some cases even when a suitably sized or R-value product exists, the user may not be able to locate it.

Thus a need exists for an insulation assembly that can be relatively easily reshaped and installed by the user to meet the specific size requirements of the user. A need also exists for an insulation assembly that can be reshaped to provide different R-value coverage of areas. A further need exists for a reshapable insulation assembly and a method of use that reduces the number of discrete products needed to be manufactured and to be carried by retailers and distributors. A further need also exists for providing an insulation assembly and method of use that provides the user with increased utility or options for installation.

SUMMARY OF THE INVENTION

Therefore, it is an object of this invention to provide an insulation assembly that can be mechanically reshaped by the user.

Yet another object of this invention is to provide a method of use and insulation assembly that reduces the time and effort necessary to install such assembly in non-traditional joist spaces.

Still another object of this invention is to provide an insulation assembly that can be reshaped by the user to fit in a variety of spaces according to the needs of the user.

Still a further object of this invention is to provide an insulation assembly that can be offered for sale that meets a multiple of user needs with a single product construction.

Accordingly, one aspect of this invention includes an insulation assembly of a type useful in the insulation of buildings, the assembly including a conformable mineral fiber batt extending in a first direction, wherein the batt has a perimeter in a cross-section that is substantially perpendicular to the first direction, and an exterior layer extending in the first direction and overlying the batt perimeter, wherein the exterior layer has a perimeter in the cross-section that is substantially greater than the perimeter of the batt. The exterior layer thereby loosely encapsulates the batt, and compression of the insulation assembly urges the assembly into a new shape with different dimensions in the cross-section. In this manner the insulation assembly is adapted to be reshaped within the confines of the exterior layer into a shape defined by the user.

Preferably, the mineral fiber batt is a binderless, fibrous glass batt with some substantially long fibers. The external layer has a cross-sectional perimeter of at least five percent greater than the batt as shaped by the manufacturing process prior to application of the exterior layer. Optimally the layer is ten percent or greater. The exterior layer preferably is formed of polyethylene with a thickness less than 1.0 mil and usually in the range of between 0.2 and 0.6 mil. The adhesive layer preferably include two layers with each extending in the axial direction opposite each other on the interior perimeter of the exterior layer, and more preferably on opposed surfaces of the rectangularly shaped batt lying substantially equidistant from adjacent sides of the batt.

Another aspect of the invention includes a method for installing a reshapable insulation assembly having a conformable batt extending in a first direction, the method comprising the steps of compressing the batt in a second direction substantially perpendicular to the first direction to compress the batt in the second direction and correspondingly expand the batt in a third direction substantially perpendicular to the first and second direction, and thus form a user defined shape and size of the assembly, and placing the assembly in a selected space corresponding to the user defined shape, such that the user has selectively shaped the insulation to fit within the selected space.

Yet another aspect of the invention includes a method for installing a reshapable insulation assembly including a conformable batt extending in a first direction and having a perimeter in a cross-section perpendicular to the first direction, and an exterior layer having a perimeter in the cross-section that is substantially greater than the perimeter of the batt, wherein the method comprises the steps of compressing the assembly to increase the perimeter of the batt within the exterior layer and thus form a user defined shape and size of the assembly and placing the assembly in a selected space corresponding to the user defined shape, such that the user has selectively shaped the assembly to fit within the selected space.

A further aspect of the invention includes a method of insulating a structure having at least first and second spaces having first and second widths, respectively, including the steps of providing first and second substantially identical insulation assemblies, wherein each assembly includes a conformable batt extending in a first direction and having a width in a direction substantially perpendicular to the first direction that is equal to the first width, and placing the first assembly in the first space. The method further includes compressing the batt of the second assembly in a second direction substantially perpendicular to the first direction thereby expanding the batt of the second assembly in a third direction substantially perpendicular to the first and second directions, and thus changing the width of the batt of the second assembly such that it is equal to the second width, and placing the second assembly in the second space.

A further aspect of the invention includes a method of insulating a structure having at least first and second spaces having first and second widths, respectively, comprising the steps of providing first and second substantially identical insulation assemblies, each assembly including a conformable batt extending in a first direction and having a third width in a direction substantially perpendicular to the first direction; compressing the batt of the first assembly in a second direction substantially perpendicular to the first direction thereby expanding the batt of the first assembly in a third direction substantially perpendicular to the first and second directions, and thus changing the width of the batt of the third assembly from the third width to the first width; placing the first assembly in the first space; compressing the batt of the second assembly in one of the second and third directions, thereby expanding the batt of the second assembly in the other of the second and third directions, and thus changing the width of the batt of the second assembly from the third width to the second width; and placing the second assembly in the second space.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION AND PREFERRED EMBODIMENTS OF THE INVENTION

Figure 1:
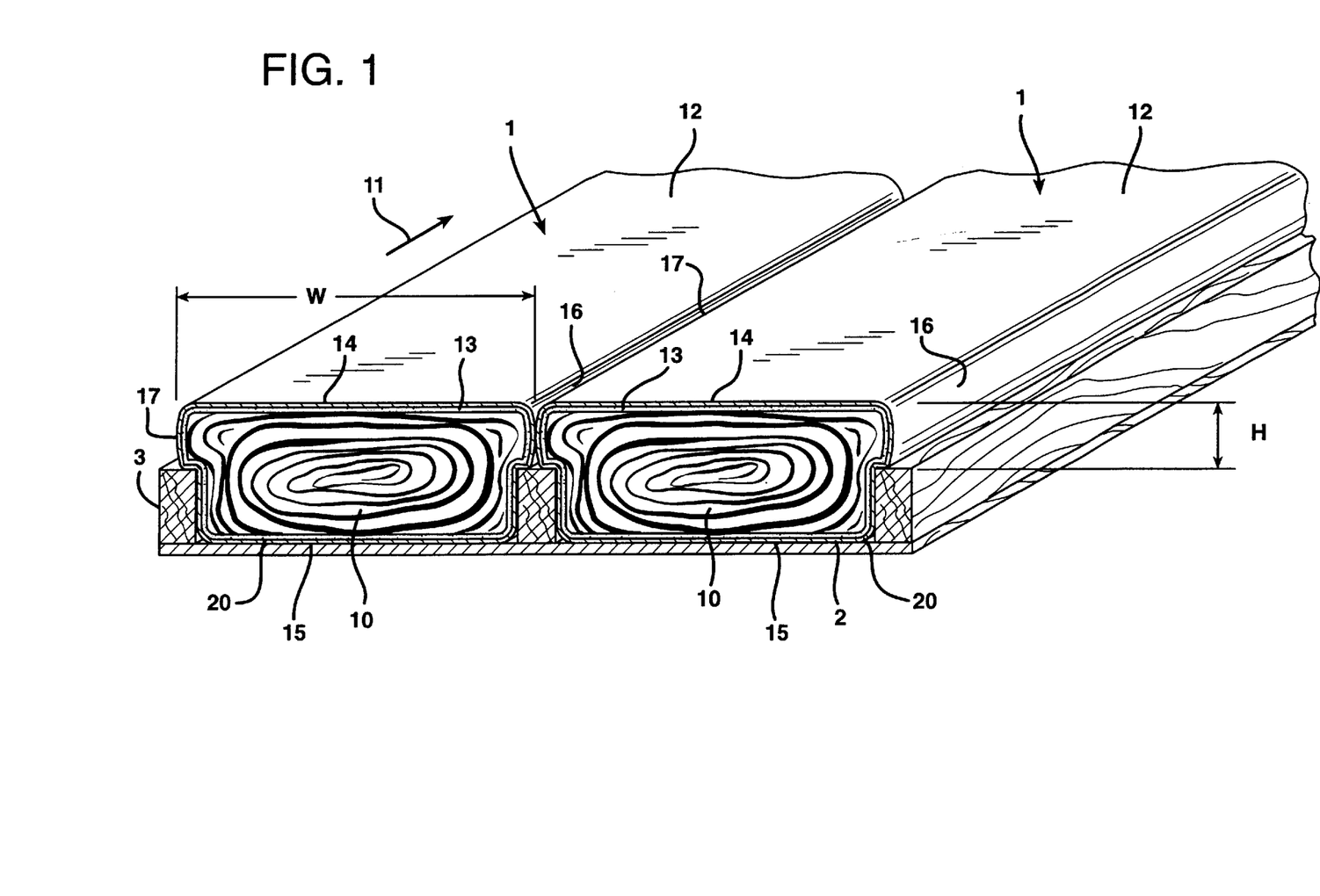
FIG. 1 is an end perspective view of a preferred embodiment of a reshapable insulation assembly in accordance with the present invention.

As depicted in FIG. 1 each of the two conformable insulation assemblies 1 lie on a surface 2, such as an upper surface of a ceiling, and between joists 3. Each assembly 1 includes an elongated batt 10 that extends in axial direction 11, an exterior or external layer 12 that extends in the axial direction and overlies at least a substantial portion of the batt 10, and at least one adhesive strip 13 that secures an external layer 12 to the batt 10. The batts 10 are formed of mineral fibers, which as defined herein preferably include glass fibers, but could alternatively include rock, slag or basalt fibers, or any of the above with up to 10 percent commingled polymer fibers. It will be understood that each of the drawings in this application are intended to be illustrative and do not reflect scale or relative size of the insulation assembly 1 and its elements. That is certain elements have been oversized or accentuated while other have been reduced for ease of understanding and convenience.

As shown installed in FIG. 1, the batt 10 has nominally perpendicular surfaces 14, 15, 16, and 17 that are also substantially perpendicular to the direction 11. The nominal width of the opposed surfaces 14 and 15 which for convenience will be referenced as the top surface 14 and bottom surface 15 are represented by W. Likewise, the height of the opposed surfaces or sides 16 and 17 is represented by H. It will be appreciated that due to the conformable nature of the product that the top surface 14 and bottom 15 will not be truly equivalent to the other. That is the width W in FIG. 1 is only approximate. Thus as shown in FIG. 1, the top surface 14 is larger than the bottom surface as it partially overlies the joist 3 while the bottom surface 15 extends between the joists 3. Similarly the side surfaces 16 and 17 are not necessarily equivalent in height and truly parallel. Nevertheless for ease of understanding and for the purposes of this patent application: each of the sides 16 and 17 and the top surfaces 14 and 15, respectively will be referenced as nominally parallel and equivalent to the opposed surface, sides 16 and 17 are referenced as nominally perpendicular to the top and bottom surfaces 14 and 15; and the surfaces 14, 15, 16 and 17 are reference as substantially perpendicular to the direction 11.

In FIG. 1, the external layer 12 includes an excess amount of material 20 that in this case the user gathered along the surface 2 during the installation of the product. In other words, the perimeter of the exterior layer 12, in a cross-section perpendicular to the direction 11, is substantially greater than the perimeter of the batt 11 in the cross-section. The oversized nature of the external layer enables the user of the assembly 10 to compress the batt 11 in a manner which increase and decrease the overall perimeter of the batt 11, as needed. This feature enables the user to reshape the insulation assembly 1 to a size that corresponds to the user's needs within the overall limits of the perimeter of the external layer 12. Thus, this feature of the invention enables a user to reshape the product according to the width of the space to be insulated. Moreover, because this insulation assembly includes the conformable batt 10, the assembly 1 can even in its reshaped condition be conformed to fill in and around voids and items found between the joists 3.

This feature avoids the need for users of fibrous insulation assemblies to cut and piece pieces of the assembly to install insulation between non-traditionally spaced joists that are not adapted to receive standard sized insulation assemblies of the prior art. It thus provides a relatively easy to install alternative to loose fill insulation products. That is by reshaping the insulation assembly of this invention the user can achieve coverage of a variety of sized spaces so that one product will meet the demands of users having different needs. The user can also compress the assembly 10 into other shapes that have an even smaller perimeter as more fully discussed below. As an additional benefit this product also has the conformable attributes so that it can be conformed to irregularities in between particular joists.

Figure 2A:
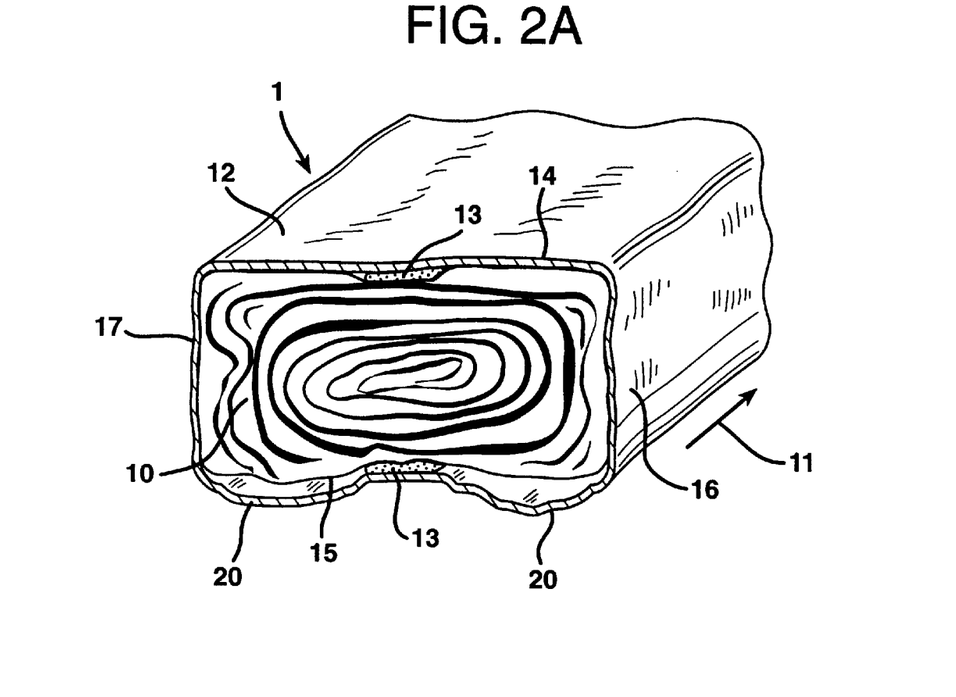
FIGS. 2A, 2B, and 2C are perspective end views of various reshaped configurations of the reshapable insulation assembly of FIG. 1 after reshaping.
Figure 2B:
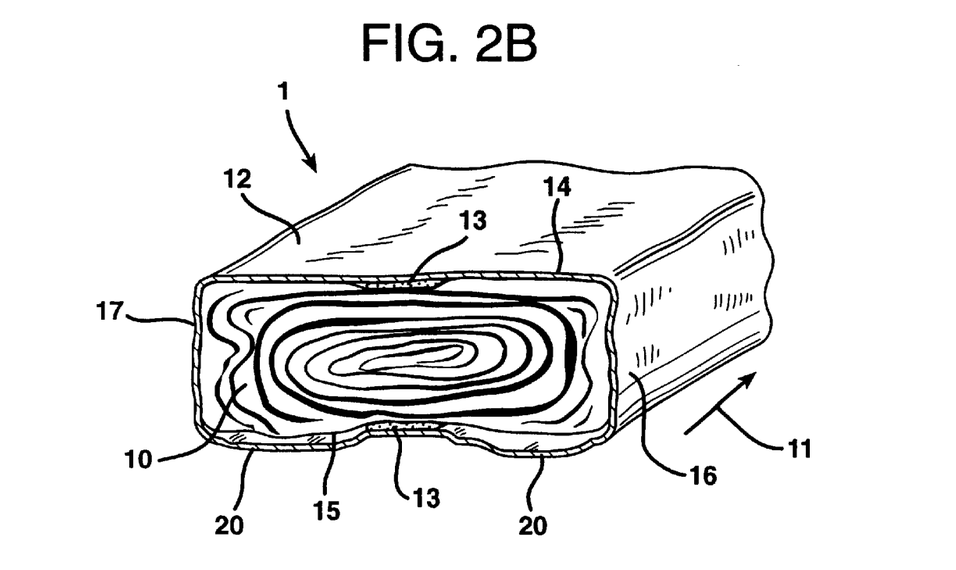
Figure 2C:
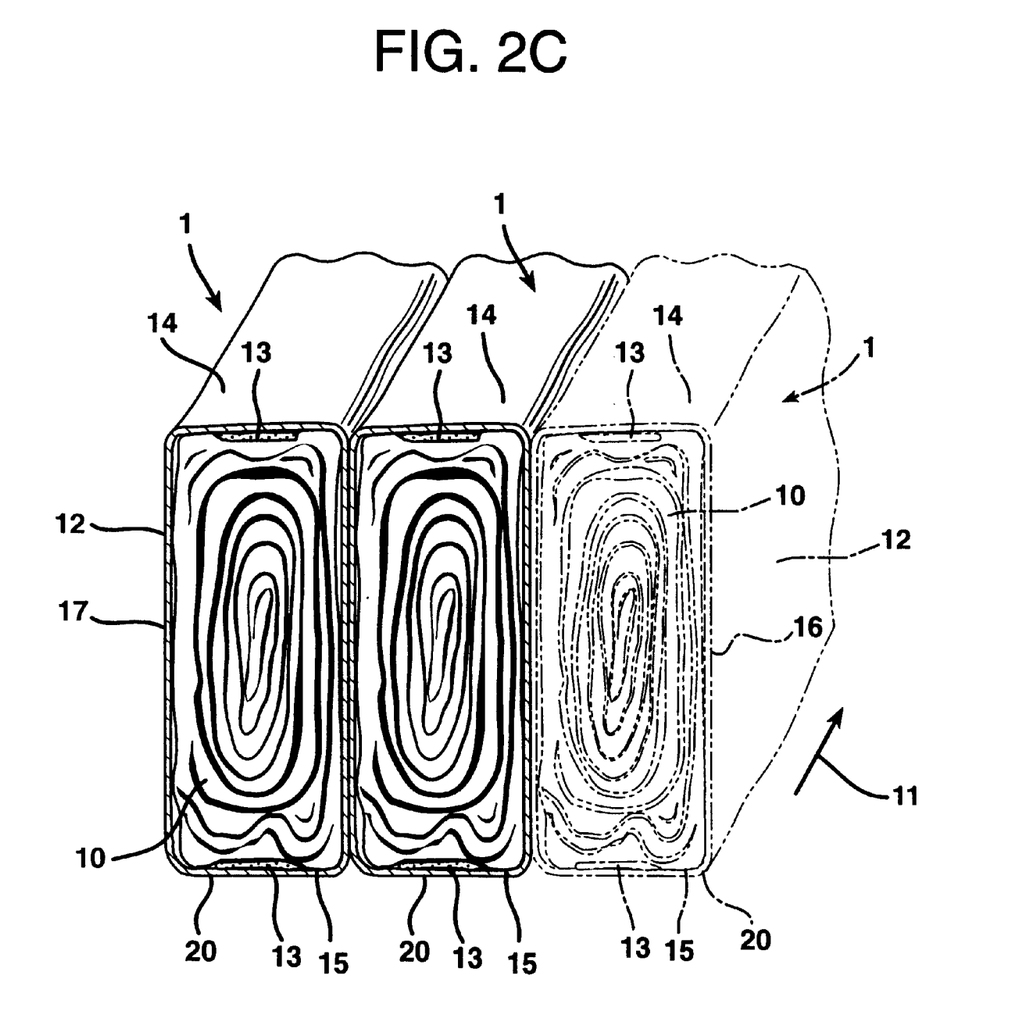
Figure 4:
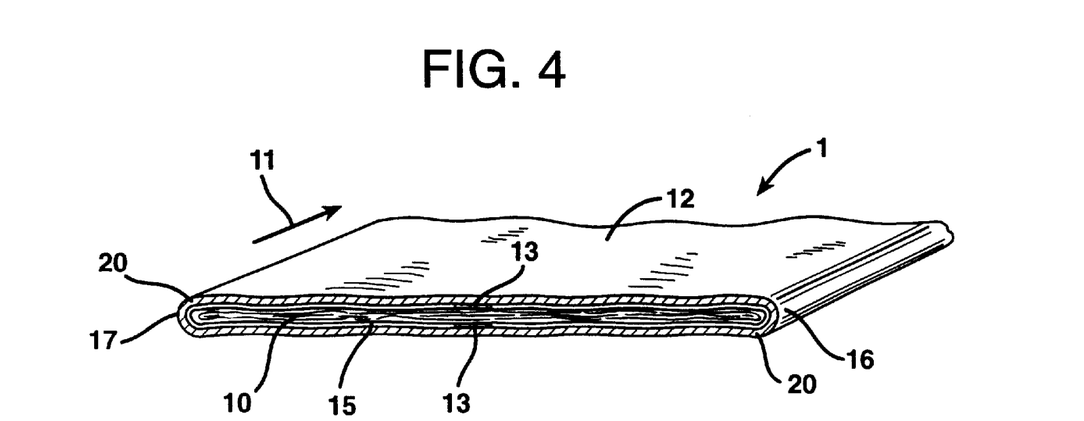
FIG. 4 is a perspective end view of the reshapable insulation assembly of FIG. 3 after compression for shipment.

FIGS. 2A through 2C depict various shapes that can be attained by user compression of the reshapable insulation assembly 1 of FIG. 1. Specifically, FIG. 2A is the insulation assembly of FIG. 1 after restoration from a compacted form such as depicted in FIG. 4 and described in greater detail hereinafter. This insulation assembly could be a relatively standard insulation product with the batt 10 having dimensions of 16 inches along the top and bottom surfaces 14 and 15 and 8.75 inches along the side surfaces 16 and 17 and having an insulating rating of R-25.

Sixteen inches is a relatively standard product because many buildings have joists spaced every 16 inches. Twenty-four is also another relatively traditional joist spacing arrangement. These dimensions come from the spacing of joists at a rate of either six or four joists every eight feet, respectively. However some buildings are framed at a different rate such as five joists every eight feet or some other dimensions. For the purposes of this application, these other joist spacing dimensions are referenced as non-traditional joist spacings.

As seen in FIG. 2A the additional material 20 provided in the exterior layer 12 is substantially equally divided on both sides of the adhesive layers 13 as is preferred. The length of the additional material 20 is slightly greater than ten percent of the batt's outer perimeter in the condition shown in FIG. 2A. Thus, for the previously mentioned example, the exterior layer 12 would have a perimeter of approximately 55 inches while the batt's perimeter is 49.5 inches. This additional material 20 provided in the exterior layer 12 due to its relative thin and non-rigid nature can easily be dealt with by the user during installation. For example, as depicted in FIG. 1 the additional material 20 of the exterior layer 12 is placed at the bottom of the assembly 1 and lies along the surface 2.

As the embodiments depicted in FIGS. 2B and 2C illustrate, the insulation assembly 1 of the present invention enables the user to reshape the insulation assembly into a shape and size to fit a variety of spaces. Thus users who elect to use an insulation assembly in accordance with this invention can shape the product to fit non-traditional joist spacings while another user can use the same product to fit traditionally sized joist spacing. Further, the user can place reshaped ones of the assemblies together between traditionally sized and non-traditionally sized areas to achieve higher R-values. This means that a single size of insulation assemblies in accordance with this invention can be used in a wide variety of different applications having different dimensions. Thus users benefit by having available an insulation assembly that can meet their specific application. Additionally retailers and distributors of insulation assemblies can provide insulation assemblies giving customers greater choices in meeting their needs while reducing the number of different products carried.

Thus, compression of the insulation assembly 1 along either the top and bottom surfaces 14 and 15 or along the side surfaces 16 and 17 urges the insulation assembly to change its cross-sectional dimensions. Specifically, compressing the insulation assembly along the top and bottom surfaces 14 and 15 urges the sides 16 and 17 outward. This results in an insulation assembly that is reshaped to have the top and bottom surfaces 14 and 15 with increased dimensions or width and side surfaces 16 and 17 with reduced dimensions or height. On the other hand, compressing the insulation assembly 1 along the side surface 16 and 17 urges the top and bottom surfaces apart. This action yields a reshaped insulation assembly having greater height and less width. That is the dimensions of the side surfaces 16 and 17 increase while the dimensions of the top and bottom surfaces 14 and 15 decrease.

By selectively applying compressive forces to the insulation assembly, the user can reshape the insulation assembly 1 to a desired size corresponding to the space in which the user desires to install the insulation assembly 1. In some cases the user may find it necessary or preferable after initial sizing to selectively smooth areas of the insulation assembly. This step can be accomplished by compressing portions the assembly along its previously-uncompressed opposed surfaces to provide a more uniform cross-section in those selected areas.

The insulation assembly 1 depicted in FIG. 2B has been reshaped from the shape illustrated in FIG. 2A by compressing it along the upper and bottom surfaces 14 and 15. The resulting shape from the compression exhibits increased width and reduced height relative to the shape of FIG. 2A. Using the previously recited example dimensions for FIG. 2A, the compression has been used to provide the insulation assembly with a height of approximately 7.25 inches and a width of approximately 19.2 inches. The exterior layer 12 that is approximately 55 inches in this example is almost entirely exactly matched by the perimeter of the batt 10 after compression, 52.9 inches. Thus in this configuration of the insulation assembly 1 only a small portion of the excess material 20 droops below the bottom surface 15. This configuration has been found to provide an insulation factor of R-19. The 19.2 inch width corresponds to the less common or non-traditional placement of five joists per eight feet of framing. While this is not a traditional construction technique, there are numerous applications for products of this size which until the present invention required cutting of the prior art insulation assemblies or the use of loose fill products.

Each of the insulation assemblies 1, as illustrated in FIG. 2C result from compression of the assembly 1 of FIG. 2A along the side surfaces 16 and 17. The compression in this instance produces the increased height and reduced width compared to the assembly of FIG. 2A. Again using the previously recited example dimensions for FIG. 2A, such assemblies have been compressed to the configuration depicted in FIG. 2C having widths and heights dimensions of 8 inches by 14 inches. As those skilled in the art will appreciate that two assemblies 1 when compressed to the 8 by 14 inch shapes can be used to insulate between joists spaced 16 inches apart. The addition of a third insulation assembly 1 as depicted in phantom lines in FIG. 2C allows the three assemblies 1 to be used together to insulate between joists spaced 24 inches apart. This arrangement of FIG. 2C with the side surfaces of two assemblies abutting in one 16 inch joist space provides an insulation factor of R-45. The use of three such assemblies 1 in one 24 inch joist space provides the same R-45 insulating factor.

When two of the insulation assemblies 1 of FIG. 2C are compressed to the 9.6 inch width and 13 inch height, they provide insulation between joists space 19.2 inches apart. Such an arrangement provides an R-value of R-38. Other possible shapes and sizes can be formed in this manner, although not previously made, such sizes include compressing the width of the batt 10 to be twelve inches with the height being between approximately 10 inches and 12 inches. In such case the two assemblies shown in FIG. 2C would readily install between joists spaced 24 inches apart.

As should now be understood the insulation assembly of this invention increases the options available to a user. For as illustrated by the arrangement of the assemblies 1 in FIG. 2C, the user can shape the assemblies for application in a single depth layer with an increased R-value. That is the user installs two or more insulation assemblies 1 in side-by-side arrangement rather than stacking them as done with prior art type insulation assemblies.

The side-by-side arrangement has several advantages over stacking of a short-fibered, bindered products or even a binderless, conformable batt of the prior art. First, given the conformable nature of the batt of the present invention the voids between the adjacent joists will be reduced when compared to the bindered prior art. The sides of the assemblies adjacent the joists will more readily conform. Additionally, the user can visually ascertain that each of the reshaped insulation assemblies when installed are of the desired dimensions. Stacking assemblies hides the height of individual assemblies. With confromable insulation products of the prior art, one of the insulation assemblies might be condensed with the companion assembly being expanded. Failure to achieve uniformity of the assemblies in each of the installed stacks degrades the insulating efficiency of the stacked assemblies.

Figure 3:
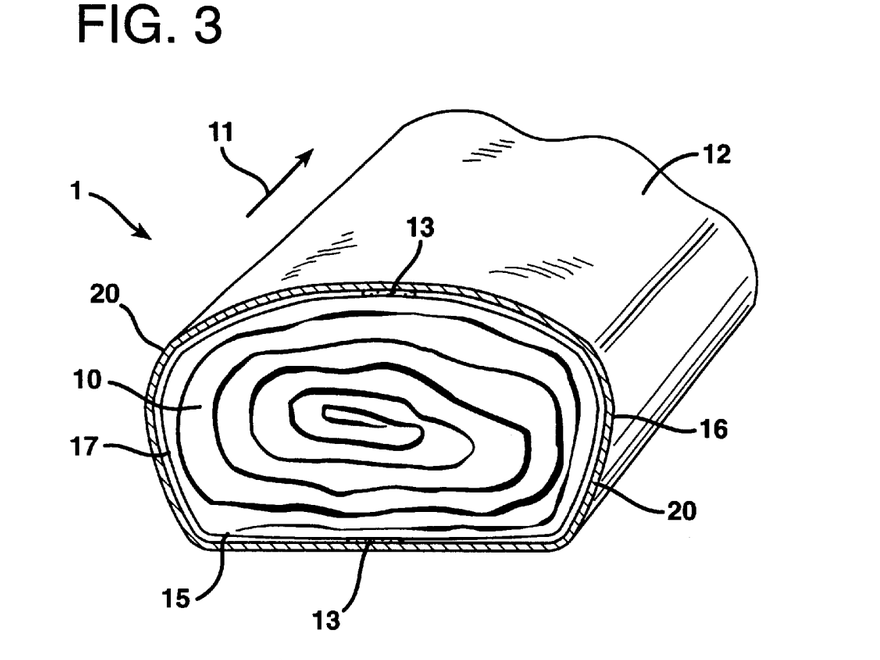
FIG. 3 is a perspective end view of the reshapable insulation assembly of FIG. 1 after manufacture.

FIG. 3 illustrates the insulation assembly 1 after completion of the manufacturing process. The process begins with producing a veil of moving gases and long glass fibers passing from a rotary fiberizing apparatus. The veil and fibers move in a generally downward direction. The long fibers also move downward with a generally spiral trajectory imparted by the rotary fiberizing apparatus. At least two opposed first conveyor surfaces below the fiberizing apparatus capture the fibers. The conveyors are usually spaced from two to six feet from the fiberizing apparatus. The spiral trajectory of the fibers results in the captured fibers interrelated or oriented in a generally spiral relationship.

Once captured, gathering the fibers forms a wool pack or batt. A set of opposed conveyor surfaces mechanically shape and conform the batt after gathering to substantially provide the desired shape of the batt with a density less than 0.60 pcf and preferably between 0.30 pcf and 0.5. pcf. In this instance the flat surfaces of the conveyors could impart substantially planar, opposed side surfaces 16 and 17 and the top and bottom surfaces 14 and 15. The process specifically excludes cutting the batt 10 parallel to its axis of manufacture, i.e., the direction 11, to define the surfaces 14, 15, 16, and 17.

The processes for making the rigid, short fibered products of the prior art often use such cutting step to provide the well defined edges and symmetry of insulating materials made by such processes. Cutting the batt of this invention would sever many of the long fibers lying along the surface of the batt. This severing would degrade the batt 10 by reducing the structural integrity of it, as it is believed that the intertwined nature enables the binderless fibers to remain together It should be understood that the shape of the batt 10 in cross-sectional views along planes perpendicular to the direction 11 does not have to be and often is not regular. That is, the side surfaces 16 and 17 are not strictly perpendicular to the top and bottom surfaces 14 and 15; the opposed surfaces 14 and 15, and 16 and 17, respectively are not strictly parallel; and each of the surfaces 14, 15, 16, and 17 are not truly planar. The batt 10 once formed and mechanically shaped is only generally rectangular, as seen in FIG. 3. However, for the ease of understanding and describing the invention, the terms nominally rectangular, nominally parallel, nominally planar, and nominally perpendicular have been adopted and used herein as described above.

The process for making the assembly 1, unlike the process disclosed by U.S. Pat. No. 5,508,079 to Grant et al., previously referenced above and now incorporated herein by reference has many similar steps to the preferred method for forming the conformable batt of the reshapable insulation assembly of this invention. However a primary and fundamental difference exists in the step of applying the exterior layer 12 which overlies the surfaces 14, 15, 16 and 17 of the batt exceeds the perimeter of the batt 10. Specifically, the layer 12 applied must exceed the perimeter by at least five percent and preferably about ten percent or greater. It is noted that excess material in the exterior layer should not probably exceed twenty percent of the perimeter of the batt as it may make handling the batt unwieldy and cumbersome during installation.

In the past the cross-section dimensions of the exterior layer was minimized for cost purposes, as the exterior layer's function has been primarily as a user convenience in the handling of the insulation assembly. In the present invention the external layer which overlies all of the surfaces comprises a boundary in which the batt can move or flow perpendicular to the axial direction 11 in response to compression. The batt due to its nature once reshaped tends to retain the shape until compressed again.

The exterior layer 12 preferably extends for all or appreciably all of the axial length of the batt 10. The exterior layer can be formed of any sheet-like material such as plastic, metalized film, Kraft paper, non-woven material or combinations thereof. It is preferred that the exterior layer be plastic, and optimally polyethylene. Generally the thickness of the exterior layer 12 should be 1.0 mil or less with it preferably being in the range between 0.2 mil. to 0.6 mil. The exterior layer 10 may also include perforations. Such perforations facilitate the entrance and expulsion of air during the recovery from the compression associated with shipping the product and during any reshaping processes associated with installation.

The adhesive layer 13 used in the insulation assembly 1 restricts the axial movement of the batt 10 relative to the exterior layer 12. The adhesive layer 13 preferably is an adhesive material such as glue applied as a layer, strip or pattern applied between the exterior layer 12 and the batt 11 at equidistantly spaced, opposite locations around the cross-sectional perimeter of the exterior layer 12. Preferably the adhesive layers 13 are provided between the exterior layer 12 and the central portions of the upper and lower surfaces 14 and 15. Alternatively the adhesive layers can be applied to the side surfaces 16 and 17. Additionally, only one adhesive layer will meet the needs of this invention although two are preferred as it enables the division of the excess material of the external layer into two substantially equal portions. The splitting of the excess material 20 between the adhesive layers simplifies working with the batt during compression and other installation tasks.

Aside from adhesive strips which are preferably formed by applying a layer of glue to the surface of the batt, known mechanical fasteners, bonding agents, or the external layer itself can suffice. For example, polyethylene when heated becomes tacky and when solidified could bond to a portion of the batt. Thus heating a thin, axially extending portion of a polyethylene sheet can provide the adhesive layer used in this invention. The heating of the polyethylene could be accomplished either immediately before overlaying the external layer or after positioning of the layer over the batt.

The adhesive layers 13 could alternatively be placed on the side surfaces 16 and 17 of the batt 10 in addition to those placed on the top and bottom surfaces 14 and 15. In such an insulation assembly formed with four adhesive layers, the excess material 20 of the exterior layer 12 would preferably be equidistantly apportioned into four segments equally divided between each of the adhesive layers. Alternatively, it is possible that the exterior layer 12 could be attached continuously around the batt 10 by the adhesive layer 13. In such case the entire insulation assembly 1 should be formed to the largest perimeter envisioned to be needed, so that the user can then compress the assembly as needed. In such a case, the excess material 20 of reshaped assemblies would need to gather together with the fibers of the batt 10 to which it is secured.

As previously described, the prior art processes sought to limit the amount of material used to form the exterior layer. In these cases, the perimeter of the exterior layer closely conforms to the perimeter of the batt. According to the present process and apparatus, the exterior layer's perimeter can exceed the perimeter of the batt as shaped by manufacturing by at least 5 percent, and preferably by ten percent or greater. This feature increases the usefulness of the reshapable insulation assembly of this invention. It enables the user to selectively reform and reshape the insulation assembly into selected shapes. Thereby users can achieve shapes and sizes suited for installation in relatively traditionally sized spaces and non-traditionally sized spaces as well as adjusting the thermal resistivity by packing multiple assemblies between joists. These features of the invention also enable retailers or distributors to carry one insulation product that can be installed in different sized spaces and can offer different insulating efficiencies without cutting, special equipment or other time consuming or skilled operations.

The invention further enables merchants who must stock and display insulation assemblies to reduce the variety of products displayed and stocked. This results from the fact that the insulation assembly of the present invention can be used to fill a variety of spaces and to provide different levels of insulation efficiency. Thus by stocking only a few different insulation assemblies according to this invention, a seller could provide a user with an insulation assembly that would meet most conceivable installation needs of the user.

Compression of the insulation assembly 1 of FIG. 3 after completion of the production results in the insulation assembly 1 of FIG. 4. First the insulation assembly passes through shaping rollers positioned to contact the side surfaces of the assembly. The rollers crease or tuck the exterior layer 12 and the batt 10 along the opposed side surfaces in the direction 11. This provides a more uniform side surface of the assembly and takes up the excess material 20 of the external layer 12. The insulation assembly 1 can then be rolled, compressed or otherwise packaged by known techniques. Compression as demonstrated by the assembly 1 illustrated in FIG. 4 substantially reduces the volume of the assembly while enabling the user to return it to its original size.

As disclosed herein, the provision of excess material in the exterior layer of a conformable insulation assembly provides a more useful product. Specifically, the insulation assembly can be shaped by the user to fit into different sized spaces without cutting. Because the user can adjust the insulation assemblies into various sizes and shapes, the manufacturer can reduce the number of different product sizes that it has to produce.

The insulation assembly according to this invention also incorporates all the advantages of the insulation assembly disclosed by Grant et al. in U.S. Pat. No. 5,508,079. The product can easily conform to the voids and abnormalities found between joists. The insulation assembly thus reduces the likelihood that the user will need to cut the batt to fit around obstacles and to fill voids. The user may also obtain higher R-value insulation from a short fiber, bindered batt by shaping the products to permit installation with two or more units side-by-side between joists.

The cost of manufacture of insulation assemblies according to this invention will be slightly higher due to the increased material costs of the excess material included in the exterior layer. The process does not however require any additional equipment to manufacture it over that disclosed by Grant et al. in U.S. Pat. No. 5,508,079. Additionally due to the multiple uses of particular insulation assemblies, manufacturing lines will not need conversion as often and this should decrease manufacturing costs. This savings should offset at least in part the additional costs associated with the excess material included in the exterior layer.

In summarization a reshapable insulation assembly and methods for installing and making such assemblies have been disclosed. The inventions herein described meet the objects and aims of this invention by providing an insulation assembly that can be selectively configured in shape by the user to achieve a variety of cross-sectional dimensions to fit a variety of apertures and to provide various levels of thermal resistivity. The invention has further advantages to both users and sellers because individual insulation assemblies have a multiplicity of applications, and retailers and distributors can stock fewer product types yet offer the users greater choice in finding a product meeting the user's needs. Additionally, the insulation assembly of the present invention can be installed without the need of specialized expertise or tools. It can be manufactured using present technology without additional equipment and without any significant increase in the cost of the product over the prior art conformable insulation assemblies.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States. is:

1. An insulation assembly for use in the insulation of buildings, said assembly comprising:

a conformable mass of mineral fiber extending in a first direction, said mass having a perimeter located around all of said mass of mineral fiber and in a plane that is substantially perpendicular to said first direction; and an exterior layer extending in said first direction and overlying said perimeter of said mineral fiber mass, said exterior layer having a perimeter in said plane that is substantially greater than said perimeter located around all of said mineral fiber mass, whereby said exterior layer loosely encapsulates said mineral fiber mass and whereby compression of said insulation assembly urges said assembly into a new shape with different dimensions in said cross-section.

2. An assembly as recited in claim 1, wherein said external layer has a perimeter in said cross-section of at least 5 percent greater than the perimeter of said mineral fiber mass in said cross-section.

3. An assembly as recited in claim 2, wherein the perimeter of said exterior layer in said cross-section is between 5 and 10 percent greater than the perimeter of said mineral fiber mass in said cross-section.

4. An assembly as recited in claim 2 wherein the perimeter of the exterior layer in said cross-section is over 10 percent greater than the perimeter of said mineral fiber mass in said cross-section.

5. An assembly as recited in claim 1, wherein said mineral fiber mass includes substantially long glass fibers.

6. An assembly as recited in claim 5, wherein said mineral fiber mass is fibrous glass wool having a density of less than 0.6 pcf.

7. An assembly as recited in claim 1 wherein said exterior layer is selected from the group consisting of plastic, metalized films, Kraft paper, non-woven materials and combinations thereof.

8. An assembly as recited in claim 1 wherein said exterior layer is a polyethylene layer having a thickness of less than 1.0 mil.

9. An assembly as recited in claim 1, further comprising an adhesive layer disposed between said exterior layer and a portion of one surface of said batt.

10. An assembly as recited in claim 9, further comprising a second adhesive layer directly opposite said first adhesive layer around said perimeter of said exterior layer.

11. An assembly as recited in claim 1, wherein the perimeter of the exterior layer is about 20% greater than the perimeter of said mineral fiber mass.

* * * * *